United States Patent [19]
Rees

[11] 3,974,505
[45] Aug. 10, 1976

[54] RECORDING DEVICE WITH PLURAL RECORDING DISCS WITH ONE DEFLECTED FOR IMPROVED VIEWING

[75] Inventor: James George Arthur Rees, Bromley, England

[73] Assignee: C. L. Instruments Limited, England

[22] Filed: Nov. 13, 1974

[21] Appl. No.: 523,481

[30] Foreign Application Priority Data
Nov. 21, 1973 United Kingdom............... 53905/73

[52] U.S. Cl.................................. 346/44; 346/45; 346/137; 346/145
[51] Int. Cl.² ..................... G01D 9/06; G01D 15/28
[58] Field of Search .................. 346/17, 18, 44, 45, 346/137, 145

[56] References Cited
UNITED STATES PATENTS

| | | | |
|---|---|---|---|
| 1,760,947 | 6/1930 | Healey | 346/137 |
| 1,864,566 | 6/1932 | Walter | 346/137 UX |
| 2,152,303 | 3/1939 | Cunningham | 346/137 |
| 2,600,822 | 6/1952 | Yarnall et al. | 346/137 UX |
| 3,430,966 | 3/1969 | Gregg | 346/137 X |
| 3,761,948 | 9/1973 | Voegtlin et al. | 346/44 |

Primary Examiner—L. T. Hix
Assistant Examiner—Stanley J. Witkowski
Attorney, Agent, or Firm—Hill, Gross, Simpson, Van Santen, Steadman, Chiara & Simpson

[57] ABSTRACT

A recording device comprising means for supporting a first record and a second record in adjacent parallel relationship, recording pens for recording data on said first and second records, means for displacing said records relative to said recording pens, and roller for deflecting at least part of said first record out of the plane of the undeflected part of the record whereby data recorded on both records can be scanned from a common direction.

24 Claims, 3 Drawing Figures

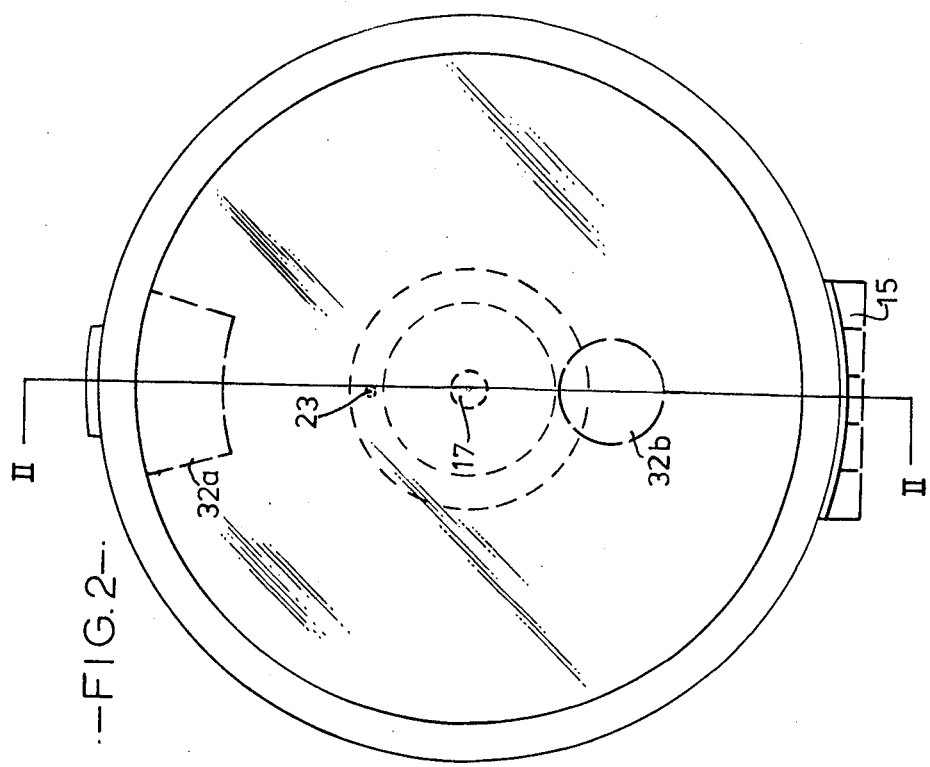
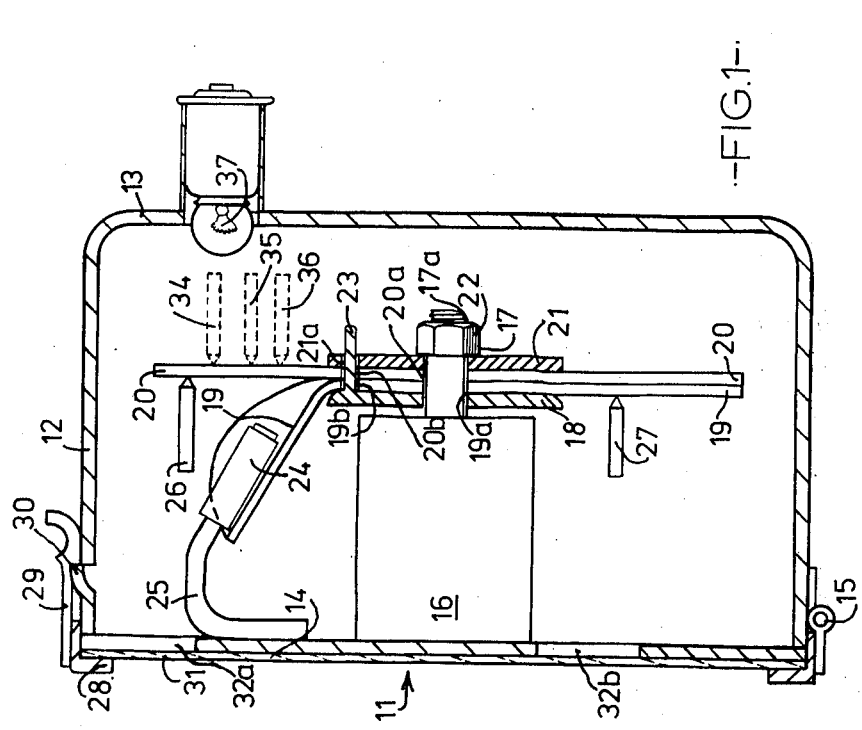

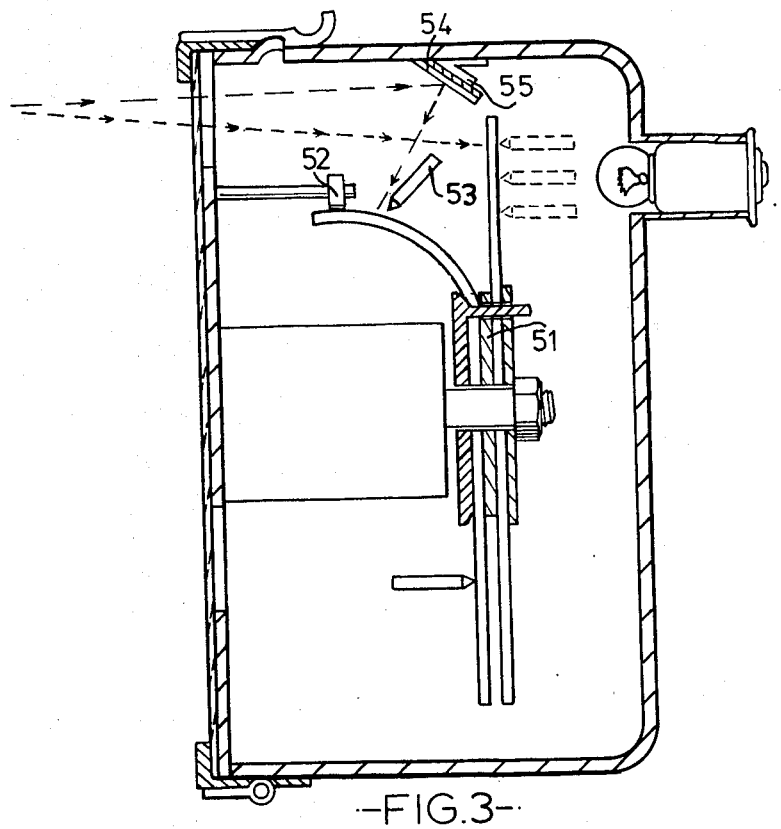
-FIG.3-

RECORDING DEVICE WITH PLURAL RECORDING DISCS WITH ONE DEFLECTED FOR IMPROVED VIEWING

This invention relates to a recording device and more particularly to a recording device capable of making two separate records of data supplied to the device.

Recording devices capable of making two separate records of data are well known in the art but when it is necessary for the records to be continuously available for simultaneous inspection the prior art devices require the records to be mounted in side-by-side relationship.

The spacial requirements of prior art recording devices which provide two records in side-by-side relationship renders such devices unsuitable for use in motor vehicles for recording data pertinent to the vehicle, particularly when the device is required to be mounted in the vehicle dash board where space is very limited.

In another form of prior art device for making two separate records one record overlies the second record, the data to be recorded is entered on the first record and the second record is made as a carbon copy of the first. The difficulty with this form of recording device is that both records must be identical and cannot therefore have different data marked thereon and further, the two records cannot be separately viewed without stopping the device and physically separating the two records.

An object of the present invention is to provide a compact recording device capable of making two separate records, and wherein data recorded on said two records can be inspected without affecting the operation of the device.

According to the present invention a recording device comprises means for supporting a first record and a second record in adjacent parallel relationship, recording means for recording data on said first and second records, means for displacing said records relative to said recording means, and means for deflecting at least part of said first record out of the plane of the undeflected part of the record whereby data recorded on both records can be scanned from a common direction.

Preferably the recorded data is visually scanned through a viewing screen and the recording means for the second record are located to record data on that region of the second record exposed by deflection of the first record.

Preferably the two records are circular and each record has a central opening therethrough by which the records can be mounted on a common spigot defining part of a support structure for the records.

Conveniently the two records are displaced in unison by rotation about the axis of the spigot and with such a construction the spigot preferably comprises a driven shaft and the radially inward regions of the two records are sandwiched between two annular plates secured for rotation with the shaft.

In one embodiment in accordance with the invention the recording means for the deflected record is arranged diametrically opposite to the recording means for the undeflected record with respect to the axis of rotation for the records.

Preferably each recording means includes a pen, supported by a linkage related to data supply means for the device, and preferably the means for causing displacement of the records comprises a clockwork motor arranged to rotate the records at substantially constant speed.

The invention will now be described further by way of example with reference to the accompanying drawings in which:

FIG. 1 shows a cross sectional view through a tachograph on the line II—II of FIG. 2, FIG. 2 shows a front view of the tachograph shown in FIG. 1, and FIG. 3 shows diagrammatically a cross sectional view, above the centre line, of a tachograph including a number of modifications which can be incorporated in the FIG. 1 embodiment.

In the illustrated example (see FIG. 1) the tachograph comprises a casing 11 defined by a cylindrical wall 12 with an integral back wall 13 and a planar front wall or face 14 connected to wall 12 by a hinge 15. A clockwork motor 16 is mounted on the front wall 14 and presents a drive shaft 17 upon which an annular backing plate 18 is rigidly mounted, the drive shaft extending at 90° to the plane of wall 14.

Two record discs 19 and 20, have central openings 19a and 20a respectively through which the shaft 17 passes and a plate 21 is mounted on shaft 17 and retained by a nut 22 on a threaded end portion 17a of shaft 17. The central regions of the discs 19 and 20 are thus contiguously sandwiched between backing plate 18 and plate 21 so that said central regions lie in parallel planes, perpendicular to the axis of shaft 17. A pin 23 extends from backing plate 18 through openings 19b and 20b in the discs 19 and 20 respectively and through a hole 21a in plate 21.

The pin 23 is radially spaced from the axis of shaft 17 and thereby, when the shaft 17 is rotated, constitutes a driving member enforcing simultaneous rotational displacement of the discs 19 and 20 and plate 21.

A roller 24, supported for rotation on a frame member 25 secured to the front wall 14, is spaced from and inclined to the plane of discs 19 and 20 and the disc 19 is engaged beneath the roller 24 whereby roller 24 deflects the upper regions of the disc 19 away from the upper regions of disc 20 to expose the upper regions of the face of disc 20 adjacent disc 19 towards the front wall 14.

The marking pen 26, controlled by a linkage (not shown) serves to record data on disc 20 and said pen 26 engages the region of said disc 20 exposed by deflection of the upper part of the disc 19. A second pen 27, supported by a linkage (also not shown), serves to record data on the disc 19. It will be observed that for convenience in arranging the driving support linkages for pens 26 and 27 the pen 27 is arranged diametrically opposite to the pen 26 with respect to the axis of shaft 17.

The front wall 14 includes an annular frame or rim 28, secured by the hinge 15 to cylindrical wall 12, with a spring 29 remote from hinge 15 engageable with a rearwardly facing abutment defined by a deformation 30 on cylindrical wall 12 so that, when engaged over the deformation 30, the spring 29 retains the front wall 14 in a closed condition for the casing 11. The front wall 14 also includes a glass front plate 31 supported within annular frame 28 and a metal disc 32 rigidly supported within frame 28 and upon which the motor 16 and bearings for the pen linkages (not shown) are mounted. The metal disc 32 (see FIG. 2) has an opening 32a in its upper regions and a circular cut-out 32b in its lower regions, which openings 32a and 32b define respectively a view port for inspection of the data recorded at the marking station defined by pen 26 and a view port for inspecting data recorded at the marking station defined by pen 27.

With the device constructed as defined hereinabove and with the motor running to rotate shaft 17 with the assembly comprising backing plate 18, discs 19 and 20, plate 21 and nut 22 supported thereon at constant speed, the roller 24 continuously deflects the upper regions of disc 19 away from disc 20, and the marking pens 26 and 27 record on the discs 19 and 20 as said discs 19 and 20 are rotated relative to the pen positions. The recorded data can be viewed through the openings 32a or 32b.

It will be appreciated that only a small part of each disc 19 or 20 is visible through the respective view ports or windows 32a and 32b but for most practical purposes where inspection of the data most recently recorded on the discs is required the data exposed is sufficient.

For a more complete inspection of the data recorded on disc 19 or 20, or for replacement of discs 19 and 20, it is only necessary to lift the free end of the spring 29 to disengage said spring 29 from deformation 30 and front wall 14 can be pivoted outwardly and downwardly about the pivot axis of hinge 15 to expose the whole of the internal parts of the device. The nut 22 can then be unscrewed and plate 21 and the discs 19 and 20 removed for inspection and/or replacement. To reassemble the discs on the motor the disc 19 is first placed on the shaft 17 and bent so that a peripheral region passes beneath the roller 24, the disc 20 is superimposed on the disc 19 and the plate 21 and nut 22 reassembled.

The above described recording device will provde adequate for the recording of relatively simple data such as the on and off duty periods of a driver and crew man for a motor vehicle. Each man will have a personal disc and, by simple manipulation of the pens 26 and 27 control knobs outside the device, the on and off duty periods for each man can be continuously recorded on his personal discs. Further, as the discs can be readily removed and replaced each man can carry his personal disc from vehicle to vehicle so that the disc can constitute a complete work record for the men.

The device illustrated for the specific embodiment and described above constitutes a very simple but effective form of a data recording device suitable for recording of vehicle crew work records and when used in such an application it will be appreciated that additional pens can be included in the device to record further data relating to the vehicle personnel or vehicle performance. By way of example the device may include additional pens, each of which is connected to a mechanism for recording data relating to the vehicle on the rear face of the disc 20. Thus, for example, one of the additional pens may record vehicle speed, another may record distance travelled, and another may record vehicle load.

Additional pens may also be provided for marking additional data on disc 19 so that the discs 19 and 20 constitute not only personal work history records but also records of vehicle data during the work period. Alternatively the discs 19 and 20 can be interchanged when the driver and crewmen reverse their roles so that the disc 20 always constitutes the driver's disc and the disc 19 always constitutes the crewmen's disc. With this latter arrangement the vehicle data is entered on a man's personal disc while he is driving and his disc is in the disc 20 position.

When pens, such as the additional pens referred to here above, are mounted to record data on the rear face of the disc 20 the said disc 20 may conveniently be formed from a material which will allow the recorded data to be viewed through the disc from the view port or window 32a. It has been found in practice that when the marking pens utilize a dark ink many translucent as well as transparent materials can be used for the manufacture of discs 20, and to assist the viewing of data through the disc 20 a light bulb 37 is mounted on the rear wall 13 to illuminate the rear face of disc 20.

In the specific embodiment a retaining spring 29 engageable with a deformation 30 has been shown as the means for retaining the front wall 14 with the cylindrical wall 12 but it is obvious that this retaining means can be replaced by a locking means to prevent access to the discs by unauthorised personnel.

FIG. 3 illustrates a number of modifications which can be individually or collectively applied to the embodiment illustrated in FIG. 1.

In a first modification illustrated in FIG. 3 a spacer 51 is inserted between the records 19 and 20 to increase the exposure of record 20. In another minor modification the record 19 is deflected by a narrow roller 52 engaged with the record periphery so that the deflected part of record 19 follows a substantially continous curvature as illustrated.

Further, the pen 27 of the FIG. 1 embodiment can be replaced by a pen 53 between the two records and engaged with the deflected part of record 19. A mirror 54, mounted on a bracket 55 secured to cylindrical wall 12, allows the data recorded on disc 19 by pen 53 to be viewed through view port or window 32a without obscuring the view of the data recorded on the disc 20 and with this arrangement the view port or window 32b may be omitted.

In a further modification (not illustrated) the single roller 24 in the FIG. 1 embodiment or the roller 52 in the FIG. 3 embodiment may be replaced by two parallel spaced apart rollers and the pen or pens recording on the deflected record may conveniently record on the deflected portion of the record between the roller.

I claim:

1. A recording device comprising a casing means for supporting a first record disc and a second record disc in substantially parallel, coaxial relationship, separate recording means for recording data on said first and second record discs respectively, means for rotating said record discs about their common axis means for deflecting part of said first record disc out of the plane of the undeflected part of said first record disc, and at least one view port provided in one wall of the casing whereby data recorded on both record discs can be viewed from a common direction.

2. A recording device according to claim 1, wherein the recording means for the second record disc are mounted within the casing so as to record data on that region of the second record disc exposed by deflection of the first record disc.

3. A recording device according to claim 1, wherein each record disc has a central opening and a spigot passes through the central opening of each record disc to provide support therefor.

4. A recording device according to claim 2, wherein the each record disc has a central opening and a spigot passes through the central opening of each record disc to provide support therefor.

5. A recording device according to claim 4, wherein a motor is provided to rotate the spigot about its longitudinal axis, the two record discs being mounted on the spigot for rotation in unison therewith.

6. A recording device according to claim 5, wherein the spigot is the motor drive shaft.

7. A recording device according to claim 6, wherein the motor is a clockwork motor arranged to rotate the records at a constant speed.

8. A recording device according to claim 6, wherein two annular plates are secured on the drive shaft for rotation therewith, the two record discs being sandwiched between the two annular plates.

9. A recording device according to claim 7, wherein two annular plates are secured on the drive shaft for rotation therewith, the two record discs being sandwiched between the two annular plates.

10. A recording device according to claim 8, wherein a pin extends from one of the two annular plates and passes through coaxially aligned holes in the two record discs and the other annular plate.

11. A recording device according to claim 6, wherein a wall of the casing supports the motor, said wall being hinged to the remainder of the casing to allow for access to the casing.

12. A recording device according to claim 11, wherein said hinged wall is planar and the longitudinal axis of the drive shaft extends at 90° to said wall.

13. A recording device according to claim 11, wherein the casing is cylindrical and the said wall is circular.

14. A recording device according to claim 12, wherein the casing is cylindrical and the said wall is circular.

15. A recording device according to claim 11, wherein the hinged wall is provided with the at least one view port.

16. A recording device according to claim 13, wherein the hinged wall is provided with the at least one view port.

17. A recording device according to claim 2, wherein the recording means includes a pen.

18. A recording device according to claim 11, wherein a freely rotatable roller is mounted on the hinged wall and arranged to deflect part of said first record disc out of the plane of the undeflected part of said first record disc.

19. A recording device according to claim 5, wherein the recording means for the first record disc is arranged diametrically opposite to the recording means for the second record disc with respect to the axis of rotation of the records.

20. A recording device according to claim 2, wherein the recording means for the first record disc is mounted within the casing so as to record data on the exposed surface of the deflected part of the record disc, which surface faces the second record disc.

21. A recording device according to claim 20, wherein a mirror is located above and angled to said exposed surface of the first record disc so that the data recorded on the first record disc can be viewed through a view port in said one wall, which view port also enables data on the region of the second record disc exposed by the deflected port of said first record disc, to be viewed directly.

22. A recording device according to claim 21, wherein the second record disc is made of a translucent material and a lamp is positioned to shine onto the face of the second record disc remote from said one wall of the casing in the region of said second record disc adjacent to said deflected port of the first record disc.

23. A recording device according to claim 1, wherein the two record discs are contiguous to each other except for the deflected part of the first record disc.

24. A recording device according to claim 3, wherein the two record discs are spaced apart by a spacer located therebetween.

* * * * *